United States Patent [19]
Song et al.

[11] Patent Number: 6,003,129
[45] Date of Patent: Dec. 14, 1999

[54] SYSTEM AND METHOD FOR HANDLING INTERRUPT AND EXCEPTION EVENTS IN AN ASYMMETRIC MULTIPROCESSOR ARCHITECTURE

[75] Inventors: Seungyeon Peter Song, Los Altos; Moataz A. Mohamed, Santa Clara; Heon-Chul Park, Cupertino; Le Nguyen, Monte Sereno, all of Calif.

[73] Assignee: Samsung Electronics Company, Ltd., Seoul, Rep. of Korea

[21] Appl. No.: 08/699,294

[22] Filed: Aug. 19, 1996

[51] Int. Cl.$^6$ ........................................... G06F 17/00
[52] U.S. Cl. ...................................... 712/244; 395/800.28
[58] Field of Search ................................... 395/591, 738, 395/739, 740, 800.3, 800.28

[56] References Cited

U.S. PATENT DOCUMENTS

| | | | |
|---|---|---|---|
| 5,193,158 | 3/1993 | Kinney et al. ............................ | 395/591 |
| 5,278,647 | 1/1994 | Hingorani et al. . | |
| 5,319,753 | 6/1994 | MacKenna et al. . | |
| 5,510,842 | 4/1996 | Phillips et al. . | |
| 5,576,765 | 11/1996 | Cheney et al. . | |
| 5,594,905 | 1/1997 | Mital ........................................ | 395/733 |
| 5,668,599 | 9/1997 | Cheney et al. . | |
| 5,729,279 | 3/1998 | Fuller . | |

*Primary Examiner*—Ellis B. Ramirez
*Attorney, Agent, or Firm*—Skjerven, Morrill, MacPherson, Franklin & Friel LLP; Ken J. Koestner

[57] ABSTRACT

A multiprocessor computer system includes a plurality of processors, called asymmetric processors, having mutually dissimilar control and data-handling characteristics. The asymmetric processors are controlled by a single operating system although the individual processors have instruction sets that are mutually independent of the other processors. The multiprocessor computer system uses a multiprocessor architectural definition of interrupt and exception handling in which a processor, called a data or vector processor, having a large machine state and a large data width detects exceptions but defers interrupt and exception handling operations to another processor, called a control processor, having a small machine state and data width. The small machine state and small data width of the control processor are well suited for executing operating system programs such as interrupt and exception handling since control programs typically involve monitoring and control of individual flags and pointers. The data processor enters an idle state upon reset and when an exception is detected to facilitate system design and programming, and to simplify synchronization of the processors at system reset. A multiprocessor computer system includes a control processor which reads and writes control and status registers within a data processor. The control processor thus controls the operation of the data processor during execution of an operating system or application programs. The control processor has access to the control and status registers of the data processor independent of the data processor execution so that the same control and status registers may be accessed by the control processor and the data processor in parallel.

25 Claims, 9 Drawing Sheets

SYSTEM AND METHOD FOR HANDLING INTERRUPT AND EXCEPTION EVENTS IN AN ASYMMETRIC MULTIPROCESSOR ARCHITECTURE

CROSS-REFERENCE TO RELATED APPLICATIONS

This patent document is related to and incorporates by reference, in their entirety, the following concurrently filed patent applications:

U.S. patent application Ser. No. 08/699,280, entitled "MULTIPROCESSOR OPERATION IN A MULTIMEDIA SIGNAL PROCESSOR", Le Nguyen.

U.S. patent application Ser. No. 08/699,597, entitled "SINGLE-INSTRUCTION-MULTIPLE-DATA PROCESSING IN A MULTIMEDIA SIGNAL PROCESSOR", Le Nguyen.

U.S. patent application Ser. No. 08/699,280, entitled "EFFICIENT CONTEXT SAVING AND RESTORING IN MULTIPROCESSORS", S. P. Song et al.

U.S. patent application Ser. No. 08/699,280, entitled "SYSTEM AND METHOD FOR HANDLING SOFTWARE INTERRUPTS WITH ARGUMENT PASSING", S. P. Song et al.

U.S. patent application Ser. No. 08/699,295, entitled "METHODS AND APPARATUS FOR PROCESSING VIDEO DATA", C. Reader et al.

U.S. patent application Ser. No. 08/697,086, entitled "SINGLE-INSTRUCTION-MULTIPLE-DATA PROCESSING USING MULTIPLE BANKS OF VECTOR REGISTERS", Le Nguyen et al.

U.S. patent application Ser. No. 08/699,585, entitled "SINGLE-INSTRUCTION-MULTIPLE-DATA PROCESSING WITH COMBINED SCALAR/VECTOR OPERATIONS", Le Nguyen et al.

BACKGROUND OF THE INVENTION

1. Field of the Invention

The present invention relates to a multiprocessor system including asymmetric processors having dissimilar control and data-handling characteristics. More specifically, the present invention relates to a system and method for handling interrupts and exceptions in an asymmetric multiprocessor system.

2. Description of the Related Art

General-purpose processors typically include circuits and structures for handling interrupts and exceptions. An interrupt is an event that causes a processor to stop execution of a current instruction thread and begin execution of an interrupt service instruction thread that is designated and activated by an interrupt handler. When the interrupt service instruction thread has completed execution, the current instruction thread continues executing. Interrupts are external events in the sense that the cause of an interrupt is not directly related to the execution of instructions in the current instruction thread. Interrupts are typically handled by saving the state or context of the processor, executing a servicing routine, and then restoring the state or context of the processor and resuming the interrupted execution thread.

An exception is a event that is caused by either the execution of an instruction or an attempt to execute an instruction by a processor, the execution of which is inconsistent with the current state of the processor. Examples of events that cause an exception condition include an attempt to execute an illegal or undefined instruction by a processor, an attempt to execute an instruction when the instruction address or data address are unaligned, a protection error, a set breakpoint, a division by zero, and an overflow condition during execution of an arithmetic instruction. A processor responds to an exception condition by executing an exception handler instruction thread. Exceptions are conventionally handled by executing a selected set of instructions depending on the particular type of condition that caused the exception condition.

The interrupt and exception handling mechanisms that are used in multiprocessor architecture systems are generally inefficient for usage in an asymmetric multiprocessor system with processors having dissimilar control and data-handling characteristics since the control operations inherent to interrupt and exception handling are quickly and easily performed by general-purpose processors and substantially more difficult for large context vector processors. Operations of multiprocessor systems that are handled using exceptions and interrupts often involve saving of the state of the processors including saving of registers and data that are currently undergoing processing. A processor with many large registers does not easily save and reload the processor state during operations such as multiple processor context switching.

What is needed is a multiprocessor architecture that facilitates exception and interrupt handling for asymmetric processors including a large machine state or context.

SUMMARY OF THE INVENTION

In accordance with one aspect of the present invention, a multiprocessor computer system includes a plurality of processors, called asymmetric processors, having mutually dissimilar control and data-handling characteristics. The asymmetric processors are controlled by a single operating system although the individual processors have instruction sets that are mutually independent of the other processors. The multiprocessor computer system uses a multiprocessor architectural definition of interrupt and exception handling in which a processor, called a data or vector processor, having a large machine state and a large data width detects exceptions but defers exception interrupt and exception handling operations to another processor, called a control processor, having a small machine state and data width. The small machine state and small data width of the control processor are well suited for executing operating system programs such as interrupt and exception handling since control programs typically involve monitoring and control of individual flags and pointers. In contrast, the large machine state and large data width of the data or vector processor handle control tasks inefficiently so that deference of interrupt and exception handling to the control processor is highly advantageous.

In accordance with another aspect of the present invention, a multiprocessor computer system includes a data processor which enters an idle state upon reset and when an exception is detected. The data processor enters the idle state to facilitate system design and programming, and to simplify synchronization of the processors at system reset.

In accordance with a further embodiment of the present invention, a multiprocessor computer system includes a control processor which reads and writes control and status registers within a data processor. The control processor thus controls the operation of the data processor during execution of an operating system or application programs. The control processor has access to the control and status registers of the data processor independent of the data processor execution so that the same control and status registers may be accessed by the control processor and the data processor in parallel.

In accordance with an additional embodiment of the present invention, a multiprocessor computer system includes an architectural definition in which the control processor is constrained to access the internal state, including the control and status registers, of the data processor only when the data processor is in an idle state. This constraint substantially simplifies programming interactions between the control processor and the data processor and protects the data processor against entering an inconsistent and invalid state.

Many advantages are achieved by the described asymmetric multiprocessor architecture and operating method. One advantage is that the programming model and data processor implementation are substantially simplified, even in comparison with a symmetric architecture that uses identical multiple processors.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE PREFERRED EMBODIMENTS

Figure 1:
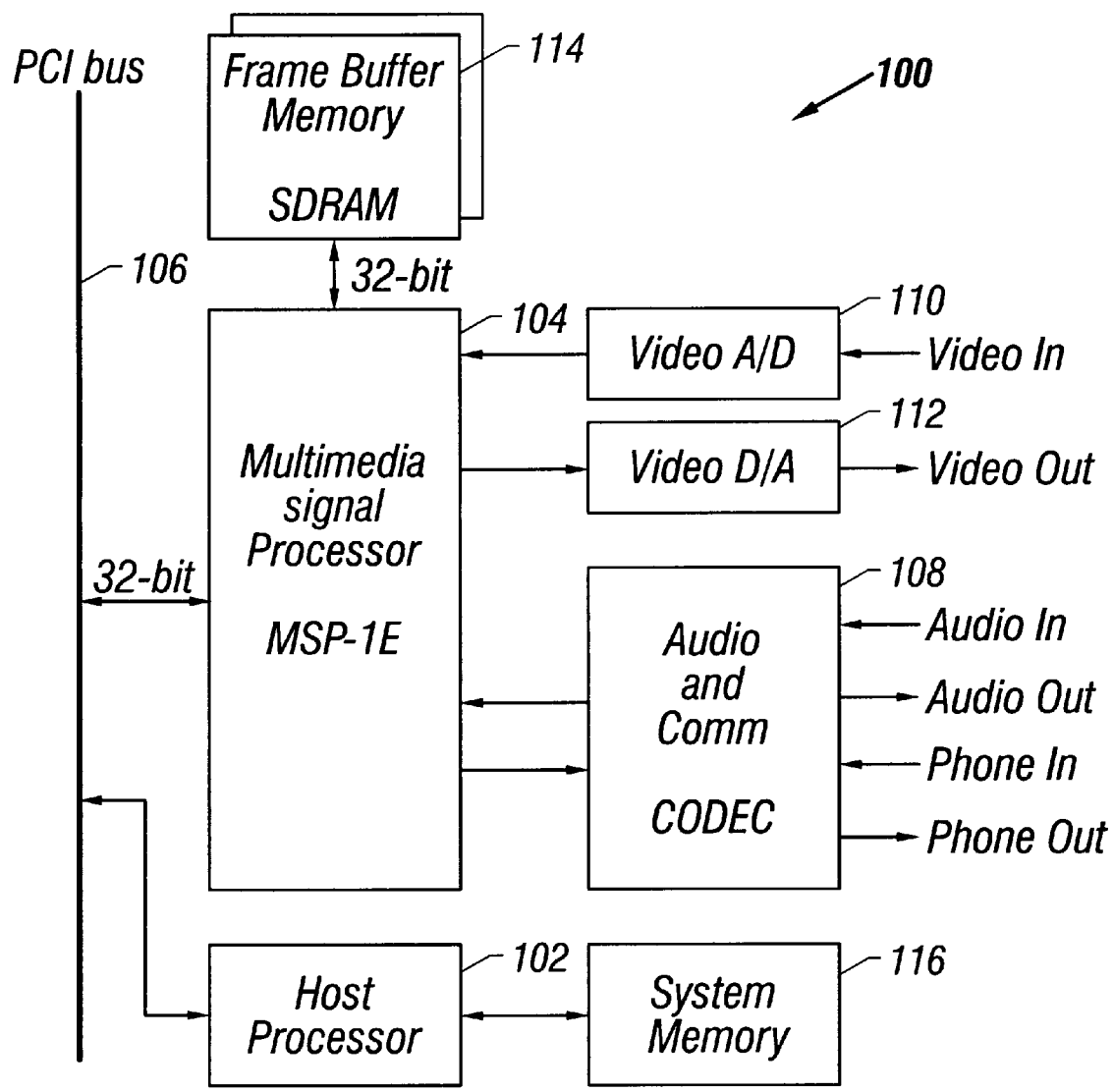
FIG. 1 is a high-level schematic block diagram illustrating a multimedia multiprocessor system in accordance with an embodiment of the present invention.

Referring to FIG. 1 a high-level schematic block diagram illustrates a multimedia multiprocessor system 100 including a host processor 102 and a multimedia signal processor 104. A typical host processor 102 is an x86 processor such as a Pentium™ or Pentium Pro™ processor. The host processor 102 executes programs based on instructions and data held in a system memory 116. The host processor 102 communicates with the multimedia signal processor 104 via a system bus 106 such as a PCI bus. The multimedia signal processor 104 interfaces to various functional blocks such as an audio and communication CODEC 108, a video A/D converter 110, a video D/A converter 112, and a frame buffer SDRAM memory 114.

Figure 2:
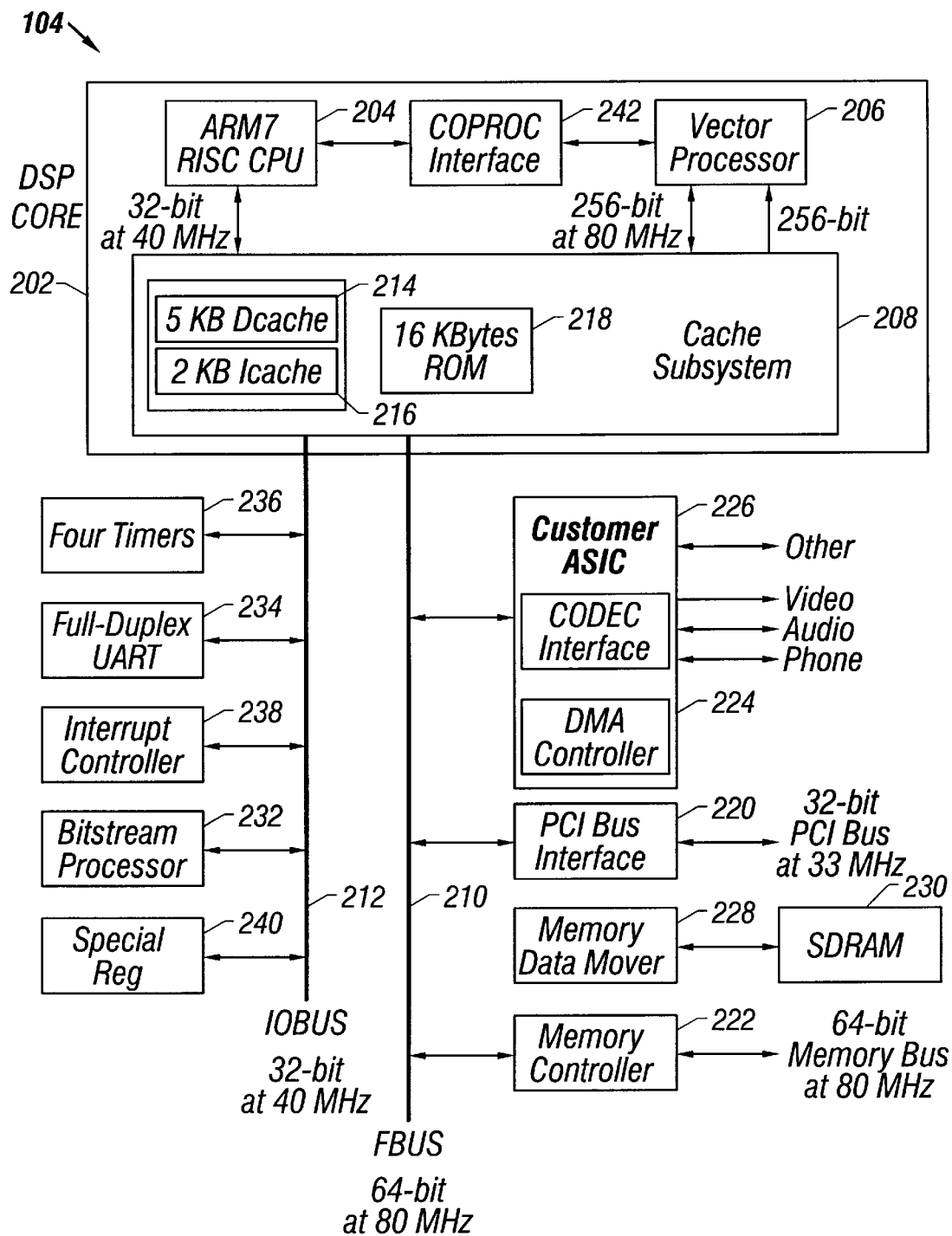
FIG. 2 is a schematic block diagram showing a multimedia signal processor included in the multimedia multiprocessor system illustrated in FIG. 1.

Referring to FIG. 2, a schematic block diagram shows the multimedia signal processor 104 within the multimedia multiprocessor system 100. The multimedia signal processor 104 includes a digital signal processor (DSP) core 202 which is connected to a plurality of multimedia interfaces.

The DSP core 202 is the computation engine of the multimedia signal processor 104 and includes a RISC control processor 204, a vector processor 206, a cache subsystem 208, a fast bus (FBUS) 210, and an I/O bus 212. The control processor 204 is a 32-bit ARM7™ control processor which is designed and manufactured by ARM Limited, Great Britain, and performs general processing functions such as real-time operating system operations, interrupt and exception handling, input/output device management, communication with the host processor 102 and the like. In one embodiment, the control processor 204 operates at 40 MHz. The control processor 204 interfaces to the vector processor 206 through a coprocessor interface 242.

The control processor 204 performs exception handling in response to exceptions, generally abnormal conditions that occur during instruction processing, causing a modification of execution control flow. The control processor 204 responds to seven types of exceptions, listed in order from a higher priority to a lower priority, including a reset condition, an abort (data) condition, FIQ, IRQ, an abort (prefetch) condition, and an undefined instruction trap or software interrupt.

Figure 3:
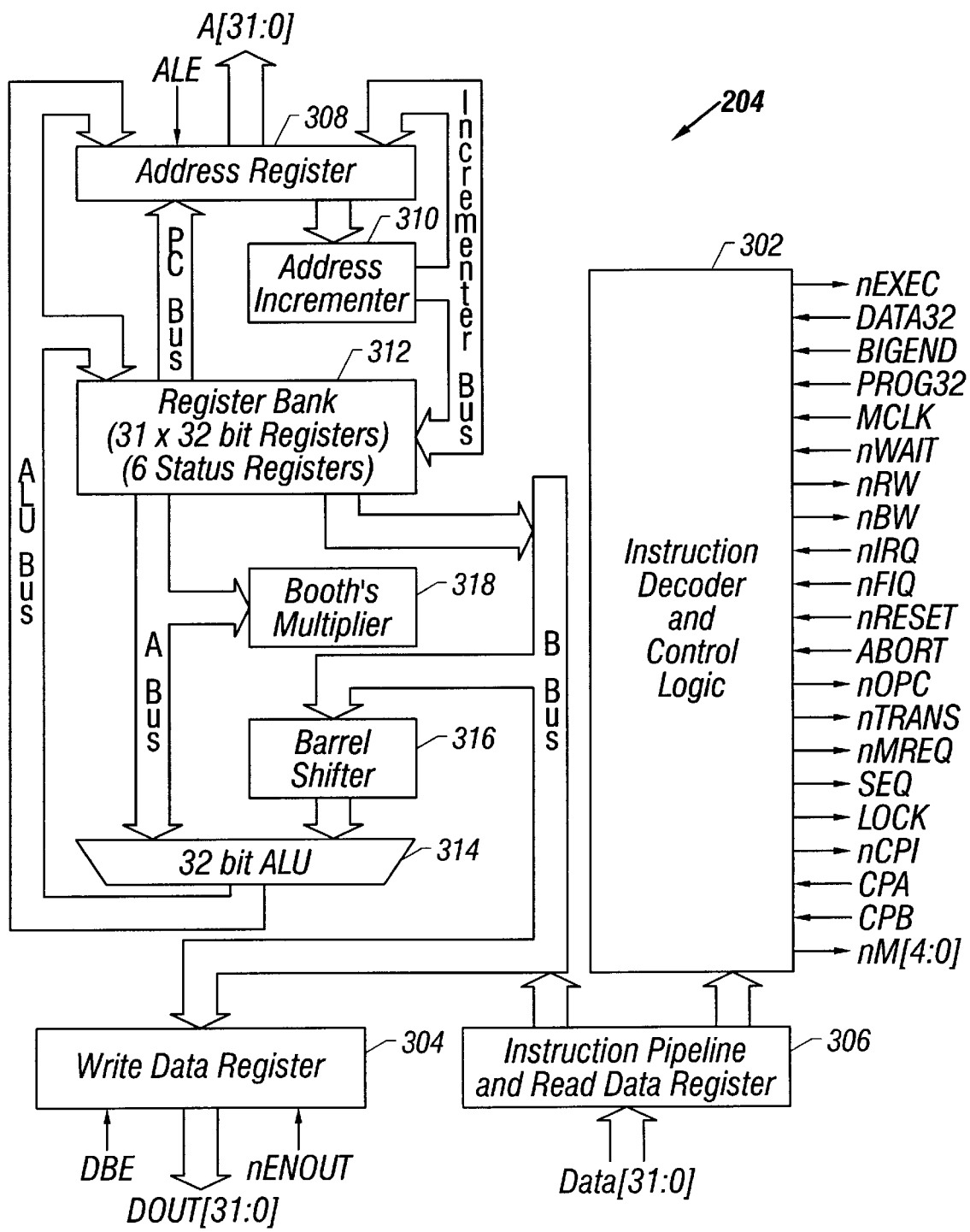
FIG. 3 is a schematic block diagram which illustrates a control processor in the multimedia multiprocessor system.
Figure 4:
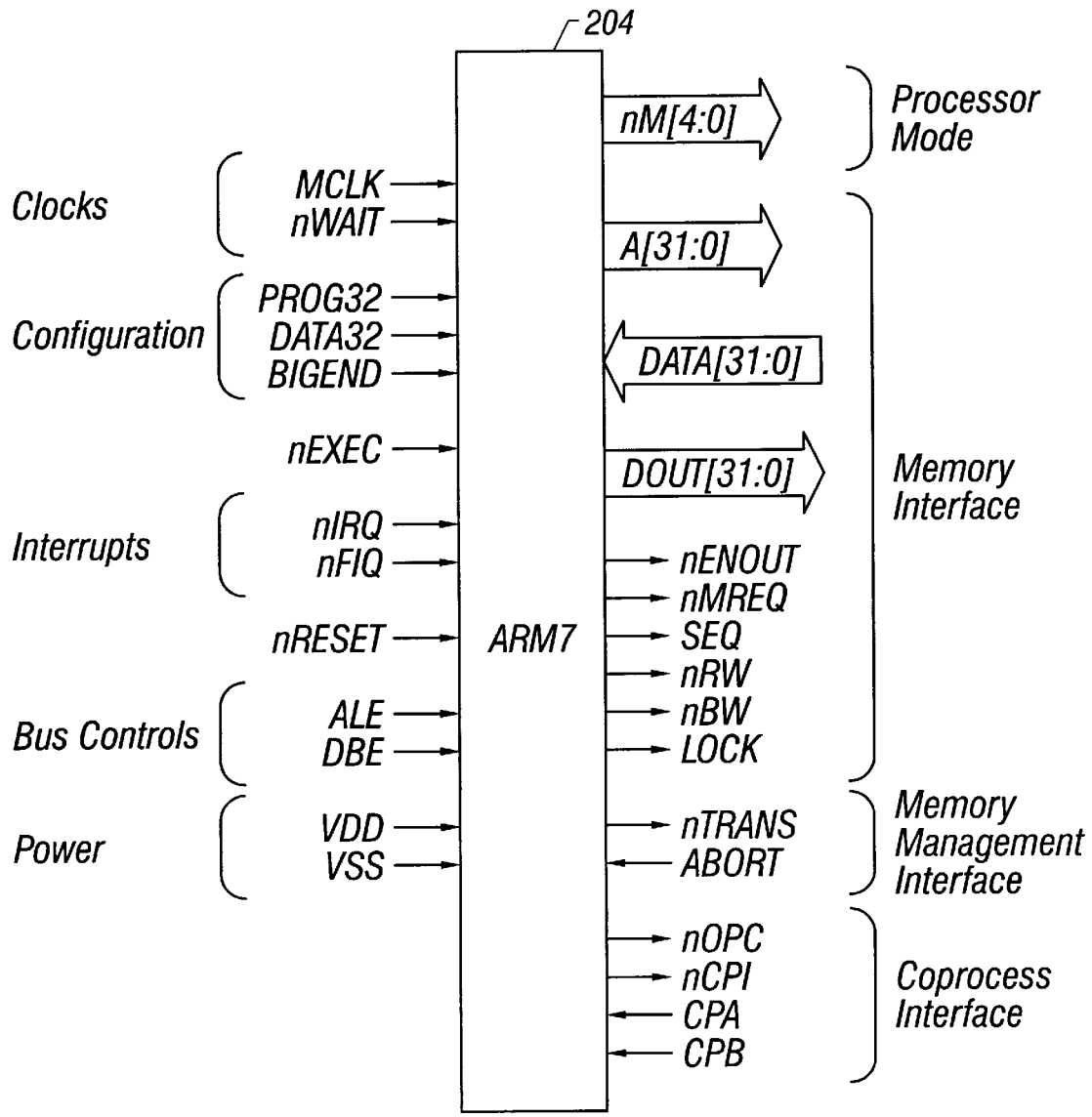
FIG. 4 is a functional diagram of the control processor.

Referring to FIG. 3, a schematic block diagram illustrates the ARM7 control processor 204 which is controlled by an instruction decoder and control logic 302. The control processor 204 communicates with the cache subsystem 208 via a write data register 304 and an instruction pipeline and read data register 306. The control processor 204 includes an address register 308 and an address incrementer 310 for addressing data in a 31×32-bit register bank 312. The control processor 204 includes arithmetic logic such as a 32-bit ALU 314, a barrel shifter 316 and a Booth's multiplier 318. The coprocessor interface 242 is coupled directly to the instruction decoder and control logic 302 via nOPC, nCPI, CPA and CPB signal lines that communicate operation codes and instruction arguments between the control processor 204 and the vector processor 206 through the coprocessor interface 242. FIG. 4 illustrates a functional diagram of the control processor 204.

The vector processor 206 is the digital signal processing engine of the multimedia signal processor 104. The vector processor 206 has a Single-Instruction Multiple-Data architecture and includes a pipelined RISC engine that operates on multiple data elements in parallel to perform signal processing functions such as Discrete Cosine Transforms (DCT), FIR filtering, convolution, video motion estimation and other processing operations. The vector processor 206 supports vector arithmetic in which multiple data elements are operated upon in parallel, in the manner of a vector process, by a plurality of vector execution units. The vector processor 206 executes both scalar operations and combined vector-scalar operations. The multiple data elements of the vector processor 206 are packed in a 576-bit vector which is computed at a rate of thirty-two 8/9-bit fixed-point arithmetic operations, sixteen 16-bit fixed-point arithmetic operations, or eight 32-bit fixed-point or floating point arithmetic operations per cycle (for example, 12.5 ns). Most 32-bit scalar operations are pipelined at a rate of one instruction per cycle while most 576-bit vector operations are pipelined at a rate of one instruction in two cycles. Load and store operations are overlapped with arithmetic operations and are executed independently by separate load and store circuits.

Figure 5:
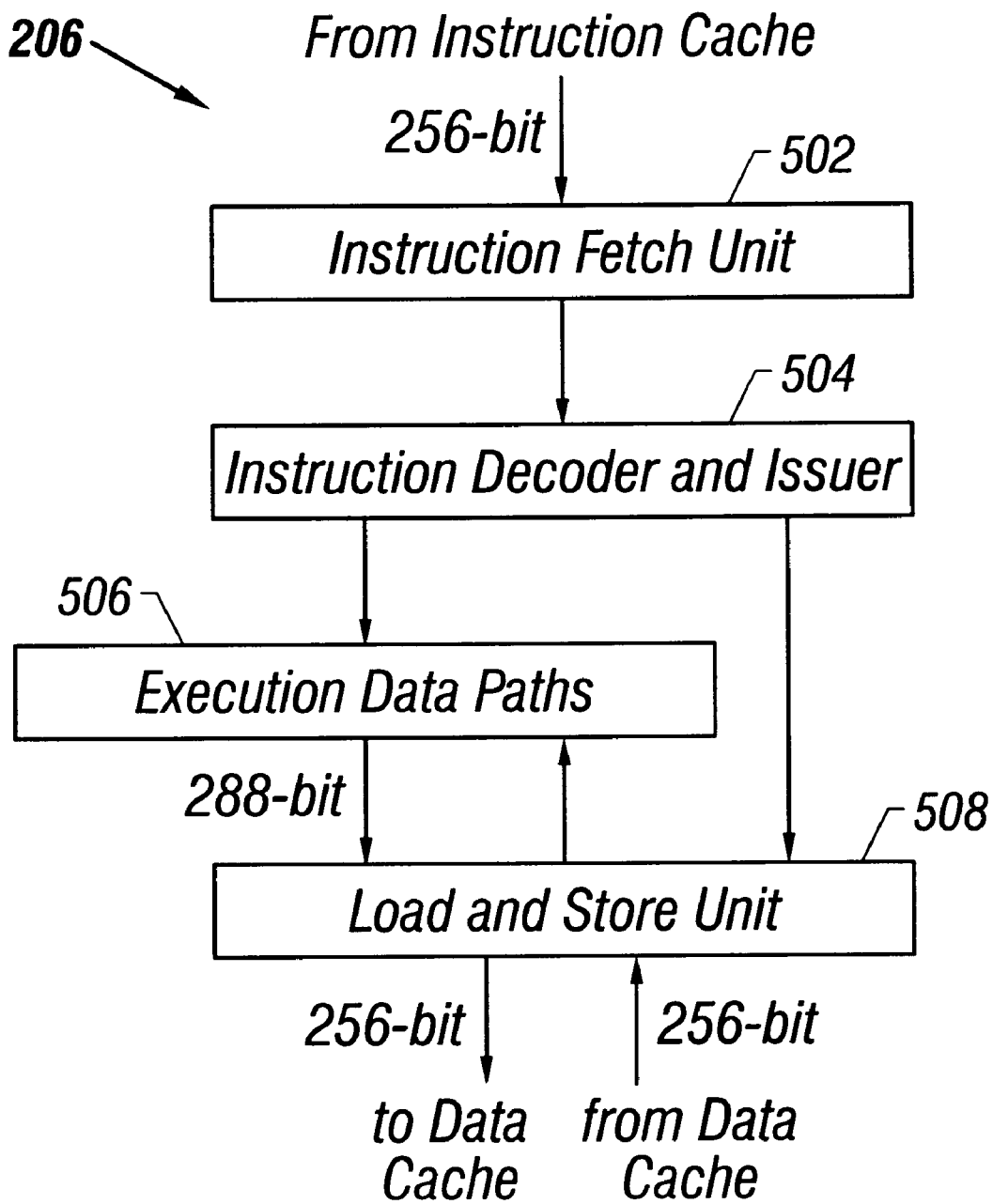
FIG. 5 is a schematic block diagram showing a vector processor in the multimedia signal processor illustrated in FIG. 2.

Referring to FIG. 5, the vector processor 206 has four functional blocks including an instruction fetch unit 502, an instruction decoder and issuer 504, an instruction execution data path 506, and a load and store unit 508. The instruction fetch unit 502 and the instruction decoder and issuer 504 are included in the vector processor 206 to allow the vector processor 206 to operate independently of the control processor 204.

The instruction fetch unit 502 prefetches instructions and processes control flow instructions such as Branch and Jump to Subroutine instructions. The instruction fetch unit 502 contains a 16-entry queue of prefetched instructions for the current execution stream and an eight-entry queue of prefetched instructions for the Branch target stream. The instruction fetch unit 502 receives up to eight instructions from the instruction cache in a cycle. The instruction decoder and issuer 504 decodes and schedules all instructions executed by the vector processor 206. The decoder processes one instruction in a cycle in the order of receipt from the instruction fetch unit 502, while the issuer schedules most instructions out-of-order depending on both the execution resource and operand data availability.

Figure 6:
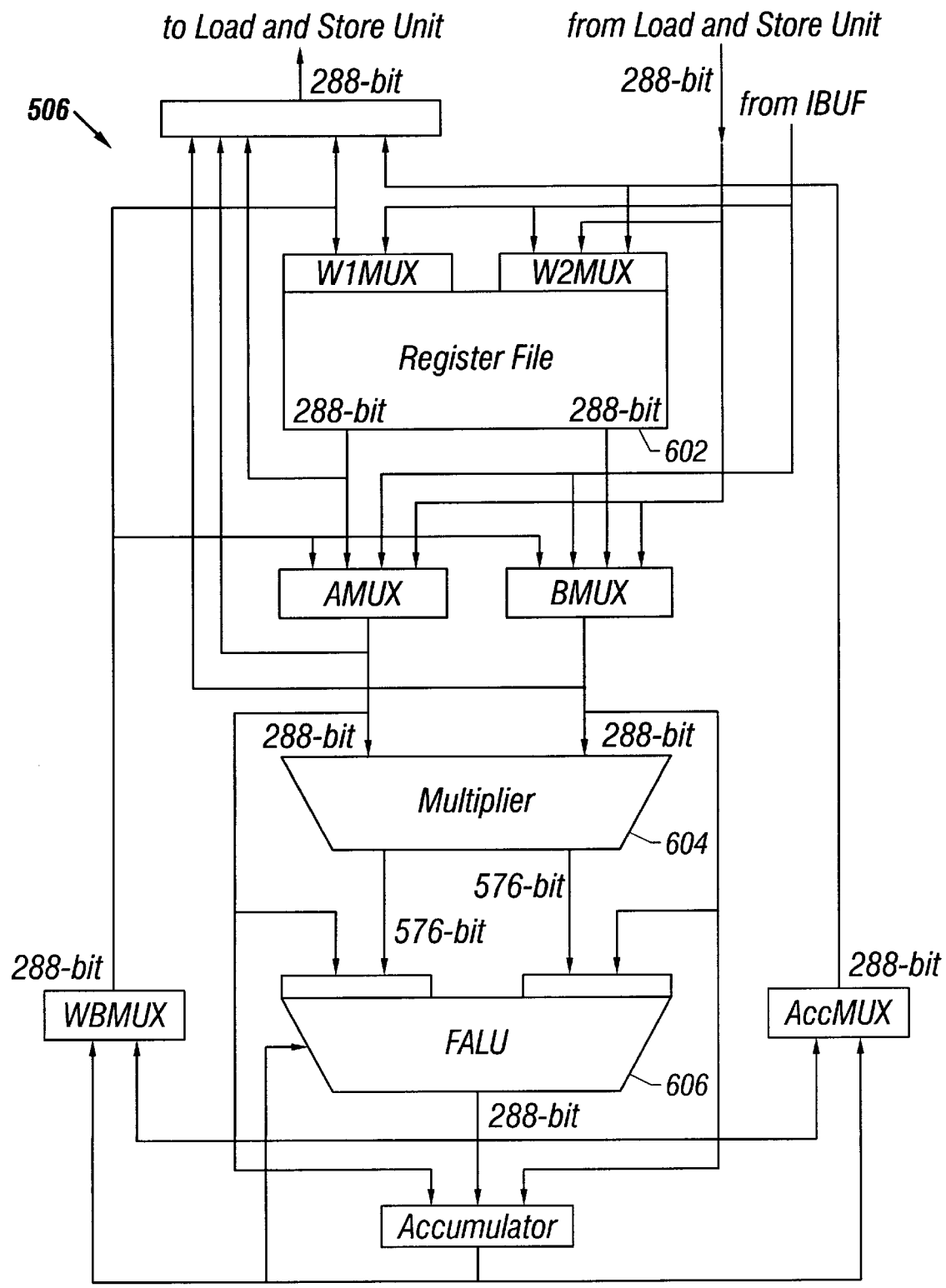
FIG. 6 is a schematic block diagram showing vector processor execution data paths of the vector processor illustrated in FIG. 5.

Referring to FIG. 6, the instruction execution data path 506 includes a four-port register file 602, eight 32×32 parallel multipliers 604, and eight 36-bit ALUs 606. The register file 602 supports two read operations and two write operations per cycle. The parallel multipliers 604 produce up to eight 32-bit multiplications in integer or floating point format, or sixteen 16-bit multiplications or thirty-two 8-bit multiplications per cycle. The ALUs 606 execute either eight 36-bit ALU operations in integer or floating point format, sixteen 16-bit ALU operations, or thirty-two 8-bit operations per cycle (for example, 12.5 ns).

The register file 602 includes a plurality of special-purpose registers and a plurality of return address registers. The special-purpose registers include a vector control and status register (VCSR), a vector program counter (VPC), a vector exception program counter (VEPC), a vector interrupt source register (VISRC), a vector and control processor synchronization register (VASYNC) and other registers such as various count, mask, overflow and breakpoint registers. The vector program counter (VPC) is the address of the next instruction to be executed by the vector processor 206.

The vector interrupt source register (VISRC) indicates the interrupt sources to the control processor 204. Appropriate bits of VISRC are set by hardware upon detection of exceptions. The bits are reset by software before execution of the vector processor 206 resumes. Any bit in the VISRC causes the vector processor 206 to enter the VP_IDLE state. If the corresponding interrupt enable bit is set in a VIMSK register in the coprocessor interface 242, an IRQ interrupt is signaled to the control processor 204.

The vector processor 206 detects exception conditions including precise exceptions and imprecise exceptions. Precise exceptions are detected by the vector processor 206 and reported prior to the faulting instruction. Precise exceptions include an instruction address breakpoint exception, a data address breakpoint exception, an invalid instruction exception, a single-step exception, a return address stack overflow exception, a return address stack underflow exception, a VCINT exception, and a VCJOIN exception. Imprecise exceptions of the vector processor 206 are detected and reported after execution of a variable number of instructions that are later in program order to the faulting instruction. Imprecise exceptions include an invalid instruction address exception, an invalid data address exception, an unaligned data access exception, an integer overflow exception, a floating point overflow exception, a floating point invalid operand exception, a floating point divide by zero exception, and an integer divide by zero exception.

The vector interrupt instruction register (VIINS) is updated with vector processor VCINT or the VCJOIN instruction when the instruction is executed to interrupt the control processor 204.

The vector processor 206 recognizes two special conditions including a CoProcessor Interrupt (CPINT) instruction that is executed by the control processor 204 and a Hardware Stack Overflow that results from multiple nested Jump to Subroutine instructions executed by software in the vector processor 206. Other interrupt and exception conditions generated in the multimedia signal processor 104 are handled by the control processor 204.

The vector processor 206 executes a power-up sequence of instructions upon system reset that places the vector processor 206 in an idle (VP_IDLE) state. The vector processor 206 remains in the VP_IDLE state until the control processor 204 initializes registers in the vector processor 206 and activates operations of the vector processor 206 using a STARTVP instruction of the control processor instruction set.

Referring again to FIG. 2, the control processor 204 initiates operations of the vector processor 206. Specifically, the control processor 204 controls interactions with the vector processor 206 through extensions to the control processor 204 instruction set. The instruction set extensions include coprocessor data operations such as a STARTVP and a INTVP instruction, coprocessor data transfers, and coprocessor register transfers, such as a TESTSET instruction and MFVP, MTVP, MFER and MTER instructions for reading and writing registers of the vector processor 206.

The control processor 204 starts the vector processor 206 using a STARTVP instruction. The STARTVP instruction causes the vector processor 206 to enter a VP_RUN state indicating that the vector processor 206 is executing. STARTVP does nothing if the vector processor 206 is already in the VP_RUN state. No result is communicated to the control processor 204 in response to the STARTVP instruction and the control processor 204 continues execution following STARTVP. The STARTVP instruction is invoked following a coprocessor data operations format (CDP) instruction which sets a condition code. The STARTVP instruction is invoked using the following assembler syntax:

CDP{cond} p7,0,c0,c0,c0 STARTVP{cond} where the conditions include equal (eq), not equal (ne), carry set (cs), carry clear (cc), minus (mi), plus (pl), and other conditions. STARTVP is executed only if the condition is true. The control processor 204 uses the STARTVP instruction to signal to the vector processor 206 a request to start execution and automatically clears the vector processor interrupt bit (VISRC<vip>) and the vector processor join bit (VISRC<vjp>) of the vector interrupt source (VISRC) register. Upon making the STARTVP call, the control processor 204 continues to execute the next instruction without waiting for the vector processor 206 to start execution. The state of the vector processor 206 must be initialized as desired before STARTVP is called. The STARTVP instruction has no affect if the vector processor 206 is already in the VP_RUN state. A vector processor unavailable exception may occur during a STARTVP instruction.

The control processor 204 stops the vector processor 206 using an interrupt vector processor (INTVP) instruction. The INTVP instruction causes the vector processor 206 to enter a VP_IDLE state indicating that the vector processor 206 is not executing. INTVP does nothing if the vector processor 206 is not executing. No result is communicated to the control processor 204 in response to the INTVP instruction and the control processor 204 continues execution following INTVP. The INTVP instruction is invoked following a coprocessor data operations format (CDP) instruction which sets a condition code. The INTVP instruction is executed only if the condition is true. Thus, the INTVP instruction is invoked using the following assembler syntax:

CDP{cond} p7,1,c0,c0,c0 INTVP{cond} where the conditions include equal (eq), not equal (ne), carry set (cs), carry clear (cc), minus (mi), plus (pl), and other conditions. The control processor 204 uses the INTVP instruction to signal to the vector processor 206 a request to halt execution. Upon making the INTVP call, the control processor 204 continues to execute the next instruction without waiting for the vector processor 206 to halt. A move from extended register (MFER) instruction is typically used following the INTVP instruction to determine whether the vector processor 206 has halted. The INTVP instruction has no affect if the vector processor 206 is already in the VP_IDLE state. A vector processor unavailable exception may occur during an INTVP instruction.

The control processor 204 tests the operating state of the vector processor 206, including testing for synchronization, using a test and set (TESTSET) instruction. TESTSET reads a user-extended register and sets bit 30 of the register to 1, supplying producer/consumer type synchronization between the vector processor 206 and the control processor 204. TESTSET causes the control processor 204 to stall until the register is transferred. The control processor 204 requests the TESTSET instruction following a coprocessor register transfer operations (MRC,MCR) instruction which sets a condition code. The TESTSET instruction is executed only if the condition is true. The TESTSET instruction is called using the following assembler syntax:

MRC{cond} p7,0,Rd,c0,cER,0 TESTSET{cond} Rd, RNAME where the conditions include equal (eq), not equal (ne), carry set (cs), carry clear (cc), minus (mi), plus (pl), and other conditions. Rd is a register in the control processor 204. ER is an extended register in the coprocessor interface 242 and RNAME refers to an architecturally-specified register mnemonic such as UER1 or VASYNC.

Other control processor instructions transfer a vector processor scalar/special-purpose register to a control processor register. Still other control processor instructions transfer a control processor register to a vector processor scalar/special-purpose register.

For example, a MFVP instruction moves data from a vector processor scalar/special-purpose register to a general register in the control processor 204. The MFVP instruction is called subsequent to a coprocessor register transfer operations (MRC,MCR) instruction which sets a condition code. The MFVP instruction is executed only if the condition is true. The MFVP instruction is called using the following assembler syntax:

MRC{cond} p7,1,Rd,CRn,CRm,0 MTVP{cond} Rd,RNAME where the conditions include equal (eq), not equal (ne), carry set (cs), carry clear (cc), minus (mi), plus (pl), and other conditions. The coprocessor number code p7 designates the vector processor 206. Rd is a register in the control processor 204. CRn and CRm are scalar/special-purpose registers in the vector processor 206. RNAME refers to an architecturally-specified register mnemonic such as SP0 or VCSR. The control processor 204 calls the MFVP instruction to move data from the scalar/special-purpose registers CRn and CRm in the vector processor 206 to the control processor register Rd. A vector processor unavailable exception may occur during a MFVP instruction.

A move to vector processor (MTVP) instruction moves data to a vector processor scalar/special-purpose register from a general register in the control processor 204. The MTVP instruction is called subsequent to a coprocessor register transfer operations (MRC,MCR) instruction which sets a condition code. The MTVP instruction is executed only if the condition is true. The MTVP instruction is called using the following assembler syntax:

MRC{cond} p7,1,Rd,CRn,CRm,0 MTVP{cond} RNAME,Rd where the conditions include equal (eq), not equal (ne), carry set (cs), carry clear (cc), minus (mi), plus (pl), and other conditions. The coprocessor number code p7 designates the vector processor 206. Rd is a register in the control processor 204. CRn and CRm are scalar/special-purpose registers in the vector processor 206. RNAME refers to an architecturally-specified register mnemonic such as SP0 or VCSR. The control processor 204 calls the MTVP instruction to move data in the control processor register Rd to the scalar/special-purpose registers CRn and CRm in the vector processor 206. A vector processor unavailable exception may occur during a MTVP instruction.

MFVP and MTVP are to be executed only when the vector processor 206 is in a VP_IDLE state. No direct communication takes place between the control processor 204 and the vector processor 206. Each transfer uses an intermediate storage which is supplied in the illustrative embodiment by the coprocessor interface 242.

MFVP and MTVP instructions allow the control processor 204 to freely read and write control and status registers within the vector processor 206. The control processor 204 thus controls the operation of the vector processor 206 during execution of operating system or application programs. The MFVP and MTVP instructions are to be executed only when the vector processor 206 is in a VP_IDLE state because the control processor 204 has access to the control and status registers of the vector processor 206 independent of vector processor 206 execution so that the same control and status registers may be accessed by the control processor 204 and the vector processor 206 in parallel.

A move to extended register (MTER) instruction moves data from the control processor 204 to a specified extended register. The MTER instruction is called subsequent to a coprocessor register transfer operations (MRC,MCR) instruction which sets a condition code. The MTER instruction is executed only if the condition is true. The MTER instruction is called using the following assembler syntax:

MRC{cond} p7,1,Rd,cP,cER,0 MTER{cond} RNAME,Rd where the conditions include equal (eq), not equal (ne), carry set (cs), carry clear (cc), minus (mi), plus (pl), and other conditions. The coprocessor number code p7 designates the vector processor 206. Rd is a register in the control processor 204. P designates a selected coprocessor and ER designates an extended register in the coprocessor P. RNAME refers to an architecturally-specified register mnemonic such as PER0 or CSR. The control processor 204 calls the MTER instruction to move data in the control processor register Rd to the designated extended register ER in the designated coprocessor P. A protection violation during attempted access to the designated coprocessor may occur during a MTER instruction.

A move from extended register (MFER) instruction moves data from an extended register in a designated coprocessor to a register in the control processor 204. The MFER instruction is called subsequent to a coprocessor register transfer operations (MRC,MCR) instruction which sets a condition code. The MFER instruction is executed only if the condition is true. The MFER instruction is called using the following assembler syntax:

MRC{cond} p7,2,Rd,cP,cER,0 MTER{cond} Rd,RNAME where the conditions include equal (eq), not equal (ne), carry set (cs), carry clear (cc), minus (mi), plus (pl), and other conditions. The coprocessor number code p7 designates the vector processor 206. Rd is a register in the control processor 204. P designates a selected coprocessor and ER designates an extended register in the coprocessor P. RNAME refers to an architecturally-specified register mnemonic such as PER0 or CSR. The control processor 204 calls the MFER instruction to move data from the designated extended register ER in the designated coprocessor P to register Rd. A protection violation during attempted access to the designated coprocessor may occur during a MTER instruction.

Figure 7:
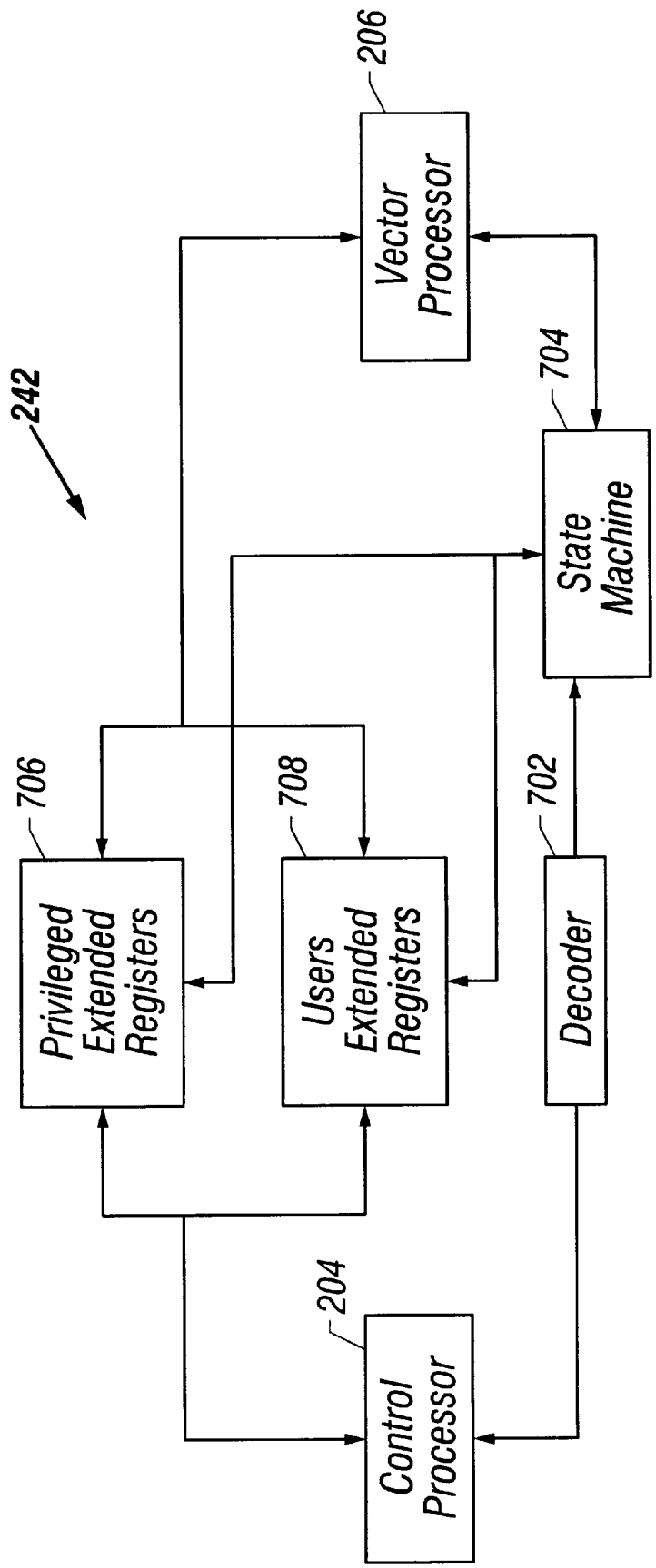
FIG. 7 is a schematic block diagram showing a coprocessor interface in the multimedia signal processor illustrated in FIG. 2.

A schematic block diagram of the coprocessor interface 242 is shown in FIG. 7. The coprocessor interface 242 supplements the functionality of the control processor 204, adding registers and logic functions for implementing instructions that extend the instruction set of the control processor 204. The coprocessor interface 242 includes registers for communicating between the control processor 204 and the vector processor 206. The coprocessor interface 242 also serves as a buffer for communicating data and signals between structures that operate at different clock rates. In one embodiment, the control processor 204 operates at a 40 MHz rate and the vector processor 206 executes at 80 MHz.

The coprocessor interface 242 includes a decoder 702, a state machine 704, a privileged extended register block 706, and a users extended register block 708. The registers in the privileged extended register block 706 and the users extended register block 708 are readable and writeable by the control processor 204 and by the vector processor 206. The decoder 702 decodes instructions of the control processor instruction set. The control processor instruction set includes instructions that are executable on the control processor 204 and extended instructions that are not executed by the control processor 204 but are instead executed by the coprocessor interface 242 to implement special coprocessor functionality. The decoder 702 decodes control processor instructions, detects extended instructions and supplies detected extension instructions to the state machine 704 for execution. The state machine 704 includes logic for implementing the extension instructions.

The privileged extended register block 706 are extended registers which are accessed during execution of special instructions by the control processor 204. The privileged extended register block 706 include a control register (CTR), a processor version register (PVR), a vector interrupt mask register (VIMSK), an instruction address breakpoint register (AIABR), a data address breakpoint register (ADABR), a scratch pad register (SPREG), and a status register (STR). The privileged extended register block 706 is used primarily for synchronization of the control processor 204 and the vector processor 206.

In one embodiment, the a users extended register block 708 registers have only a single bit, mapped to bit <30>, so that bits <31> and <29:0> are read as 0. The a users extended register block 708 includes a vector processor state flag (VPSTATE) flag and a vector and control processor synchronization (VASYNC) flag. VPSTATE indicates that the vector processor 206 is in the VP_RUN state when bit <30> is set. When bit <30> is reset, the vector processor 206 is in the VP_IDLE state and is halted with the program counter addressing the next instruction to execute. VASYNC allows producer-consumer synchronization between the vector processor 206 and the control processor 204. The VASYNC flag is set or reset by a VMOV instruction executing in the vector processor 206. VASYNC is also set or reset by a control processor 204 process using a move from extended register (MFER), a move to extended register (MTER) instruction, or the TESTSET instruction.

On power-up reset, all bits of the privileged extended register block 706 and the a users extended register block 708 are reset so that the vector processor 206 is idle.

The vector interrupt mask register (VIMSK) controls reporting of exceptions occurring within the vector processor 206 to the control processor 204. The bits in VIMSK, when set along with a corresponding bit in the vector interrupt source (VISRC) register, enable the exception to interrupt the control processor 204. The VISRC register includes a plurality of bits indicating which source of a plurality of exceptions and interrupts. Bits of the VIMSK register include a Data Address Breakpoint Interrupt enable (DABE), an instruction address breakpoint interrupt enable (IABE), and a single-step interrupt enable (SSTPE). The VIMSK further controls floating point overflow (FOVE), invalid operand (FINVE) and divide-by-zero (FDIVE) interrupt enable bits and integer overflow (IOVE) and divide-by-zero (IDIVE) interrupt enable bits. The VIMSK also controls a VCINT interrupt enable (VIE), a VCJOIN interrupt enable (VJE) and a context switch enable (CSE).

The vector processor 206 interacts with the control processor 204 by sending signals to the control processor 204. Specifically, the vector processor 206 includes logic providing read access and write access to the control processor 204. The vector processor 206, using a VCJOIN instruction and a VCINT instruction, sends signals to the control processor 204 indirectly via user-extended registers indicating that the vector processor 206 has executed a synchronizing instruction. The vector processor 206 also directly signals the control processor 204 via an interrupt request indicating that the vector processor 206 has halted execution and entered the VP_IDLE state. The vector processor 206 executes two instructions for signaling the control processor 204. The VCJOIN instruction (VCJOIN n) conditionally joins with the control processor 204 and causes the vector processor 206 to halt and enter the VP_IDLE state. A program counter (not shown) in the vector processor 206 addresses the instruction following the VCJOIN instruction. The VCINT instruction (VCINT n) conditionally interrupts the control processor 204, causing the vector processor 206 to halt and enter the VP_IDLE state. The program counter in the vector processor 206 addresses the instruction following the VCINT instruction. The VCINT and VCJOIN instructions are instructions executed by the vector processor 206 which are classified into a control flow class. The control flow instructions include various conditional instructions such as branch, decrement and branch, jump, return from subroutine, context switch and barrier instructions.

A plurality of instructions executing on the vector processor 206, including a conditional context switch (VCCS) instruction, a conditional interrupt (VCINT) instruction and a conditional join (VCJOIN) instruction, are used for interrupt and exception handling.

The conditional interrupt (VCINT) instruction, if enabled, halts execution of the vector processor 206 and interrupts the control processor 204. The VCINT instruction may generate a VCINT interrupt. The assembler syntax of the conditional interrupt (VCINT) instruction is, as follows:

VCINT.cond #ICODE where cond is a defined condition code and #ICODE is a 23-bit value that identifies a constant for usage by the control processor 204. The condition code (cond) is selected from the condition codes of unconditional (un), less than (lt), equal (eq), less than or equal to (le), greater than (gt), not equal (ne), greater than or equal to (ge) and overflow (ov). The VCINT operation is described by pseudocode as follows:

```
If   ( (cond==VCSR[SO,GT, EQ,LT]) | (cond==un) ) {
       VISRC<vip> = 1;
       VIINS = [VCINT.cond #ICODE instruction];
       VEPC = VPC;
       if (VIMSK<vie>==1)signal control processor int;
       VP_STATE = VP_IDLE;
}
else VPC = VPC+4;
```

Accordingly, if the vector control and status register (VCSR) matches the condition code or the condition code is unconditional, then the vector interrupt bit of the vector interrupt source (VISRC) register is set, the vector interrupt instruction register (VIINS) is loaded with the instruction identified by the #ICODE parameter, and the vector exception program counter (VEPC) is loaded with the value from the program counter of the vector processor 206. The vector interrupt instruction register (VIINS) is loaded with an identifier of the VCINT instruction, the condition, and the #ICODE argument to supply to the control processor 204 information relating to: (1) the reason the vector processor 206 is interrupting the control processor 204 and (2) a constant value for usage by the control processor 204 in executing a software interrupt service routine. If the vector processor interrupt enable bit of the VIMSK register is set, then the vector processor 206 sends an interrupt signal (IRQ) to the control processor 204. The state (VP_STATE) of the vector processor 206 is set to the idle state. However, if the condition code is not unconditional and the control code does not match the vector control and status register (VCSR), then the VCINT instruction is ignored except that the program counter is incremented by four.

The conditional join with control processor task (VCJOIN) instruction, if enabled, halts execution of the vector processor 206 and joins the task operating in the control processor 204. The VCJOIN instruction may generate a VCJOIN interrupt. The assembler syntax of the conditional interrupt (VCJOIN) instruction is, as follows:

VCJOIN.cond #Offset where cond is a defined condition code and #Offset is a 23-bit value that identifies the offset relative to the location of the VCJOIN instruction in vector processor 206 memory of a vector processor subroutine that is to be subsequently activated. The VCJOIN instruction activates an interrupt service routine that executes in the control processor 204. The control processor 204 saves the #Offset parameter and performs an defined interrupt service routine. During the interrupt service routine is complete, the control processor 204 performs defined operations and sets registers in the vector processor 206 for future processing. At the completion of the interrupt service routine, the control processor 204 starts the vector processor 206 using a STARTVP instruction and designates the saved address #Offset as the location of a subroutine at which the vector processor 206 is to begin executing. The offset argument is used by the control processor 204 in the manner of a branch instruction to direct the sequence of instructions executed by the control processor 204. One example of the usage of the VCJOIN instruction is depicted in U.S. patent application Ser. No. 08/699,280, entitled "EFFICIENT CONTEXT SAVING AND RESTORING IN MULTIPROCESSORS", S. P. Song et al., which is hereby incorporated by reference in its entirety. The condition code (cond) is selected from the condition codes of unconditional (un), less than (lt), equal (eq), less than or equal to (le), greater than (gt), not equal (ne), greater than or equal to (ge) and overflow (ov). The VCJOIN operation is described by pseudocode as follows:

```
If   ( (cond==VCSR[SO,GT, EQ,LT]) | (cond==un) ) {
       VISRC<vjp> = 1;
       VIINS = [VCJOIN.cond #Offset instruction];
       VEPC = VPC;
       if (VIMSK<vje> ==1) signal control processor int;
       VP_STATE = VP_IDLE;
}
else VPC = VPC+4;
```

Accordingly, if the vector control and status register (VCSR) matches the condition code or the condition code is unconditional, then the vector join bit of the vector interrupt source (VISRC) register is set, the vector interrupt instruction register (VIINS) is loaded with the instruction identified by the #Offset parameter, and the vector exception program counter (VEPC) is loaded with the value from the program counter of the vector processor 206. The vector interrupt instruction register (VIINS) is loaded with an identifier of the VCJOIN instruction, the condition, and the #Offset argument to supply to the control processor 204 information relating to: (1) the reason the vector processor 206 is interrupting the control processor 204 and (2) the offset from an address or label in instruction memory of the vector processor 206 indicating a branch offset for directing the instruction sequence flow of the vector processor routine when the control processor 204 reactivates the vector processor 206. If the vector processor join enable bit of the VIMSK register is set, then the vector processor 206 sends an interrupt signal (IRQ) to the control processor 204. The state (VP_STATE) of the vector processor 206 is set to the idle state. However, if the condition code is not unconditional and the control code does not match the vector control and status register (VCSR), then the VCJOIN instruction is ignored except that the program counter is incremented by four.

The conditional context switch (VCCS) instruction performs an immediate (not delayed) jump to a context switch subroutine if the context switch enable bit of the VIMSK register, VIMSK<cse>, is true. If VIMSK<cse> is true, a return address in VPC+4 is saved onto the return address stack. If not, the exception continues at the address VPC+4. The VCCS instruction may generate a return address stack overflow exception. The assembler syntax of the conditional context switch (VCCS) instruction is, as follows:

VCCS #Offset where #Offset is a 23-bit value that identifies the location of the context switch subroutine. The VCCS operation is described by pseudocode as follows:

```
If  VIMSK<cse> ==1) {
    if  (VSP<4> > 15) {
        VISRC<RASO> = 1;
        signal control processor with RASO;
        VP_STATE = VP_IDLE;
    } else {
        RSTACK[VSP<3:0>]=VPC+4;
        VSP<4:0> = VSP<4:0>+1;
        VPC = VPC + 4;
    }
} else VPC=VPC+4;
```

Accordingly, if the context switch enable bit of the VIMSK register is set, the return stack pointer (VSP) is tested for overflow. If an overflow condition has occurred, the return address stack overflow bit of the vector interrupt source (VISRC) register is set, the vector processor 206 sends a return address stack overflow exception to the control processor 204 and the state (VP_STATE) of the vector processor 206 is set to the idle state. If an overflow condition has not occurred, then the program counter incremented by four is pushed onto the return address stack (RSTACK), the return stack pointer (VSP) is incremented by one and the program counter (VPC) of the vector processor 206 is incremented by the sign-extended product of #Offset times four. If the context switch enable bit of the VIMSK register is not set, then the VCCS instruction is ignored except that the program counter is incremented by four.

The control processor 204 and the vector processor 206 operate independently, in parallel, once operations of the vector processor 206 begin execution following execution of the STARTVP instruction by the control processor 204. The independent, parallel operations of the control processor 204 and the vector processor 206 are synchronized using special control instructions. The support of concurrent execution of two threads: one on the control processor 204 and another on the vector processor 206, advantageously increases task execution speed and facilitates porting of instruction code operating on the control processor 204 to a variety of processors in the MSP family of processors. In the illustrative embodiment, the vector processor 206 operates at an 80 MHz rate.

Referring again to FIG. 2, the cache subsystem 208 includes a data cache 214 (for example, 5 KB), an instruction cache 216 (for example, 2 KB), and a cache ROM 218 (for example, 16 KB) and typically operates at the same speed as the vector processor 206 (80 MHz). In one embodiment, the cache subsystem 208 includes 1 Kbyte of instruction storage and 1 Kbyte of data storage for the control processor 204, 1 Kbyte of instruction storage and 4 Kbyte of data storage for the vector processor 206, and a shared 16 Kbyte of integrated instruction and data cache ROM for both the control processor 204 and the vector processor 206. The cache subsystem 208 interfaces to the control processor 204 through 32-bit data buses and interfaces to the vector processor 206 through 128-bit data buses. The cache ROM 218 includes uROM initialization software, self-test diagnostics software, various system management software, library routines and a cache for selected instructions and data constants. Specifically, the cache ROM 218 includes an instruction exception handler and input and output device interrupt handlers 0, 1, 2 and 3 for the control processor 204. The cache ROM 218 also includes a vector processor interrupt handler and a vector processor breakpoint exception handler which execute in the control processor 204.

The FBUS 210 interfaces to a plurality of FBUS peripherals including, for example, a 32-bit PCI bus interface 220, a 64-bit SDRAM memory controller 222, an 8-channel DMA controller 224, a customer ASIC logic block 226, and a memory data mover 228. The PCI bus interface 220 interfaces to the system bus 106 and operates, for example, at 33 MHz. The customer ASIC logic block 226 furnishes control logic for implementing custom functionality, as desired. The customer ASIC logic block 226, in one embodiment, supplies 10 Kgates including interfaces to various analog CODECs and customer-specific I/O devices. The memory data mover 228 transfers DMA data from the host processor 102 to SDRAM memory 230 which is local to the multimedia signal processor 104.

The I/O bus 212 interfaces to a plurality of I/O bus devices including, for example, a bit stream processor 232, a UART serial line 234, a timer circuit 236, an interrupt controller 238, and a special register 240. The bit stream processor 232 processes the video bit stream. The special register 240 is used for software-controlled initialization and interrupt handling.

Figure 8:
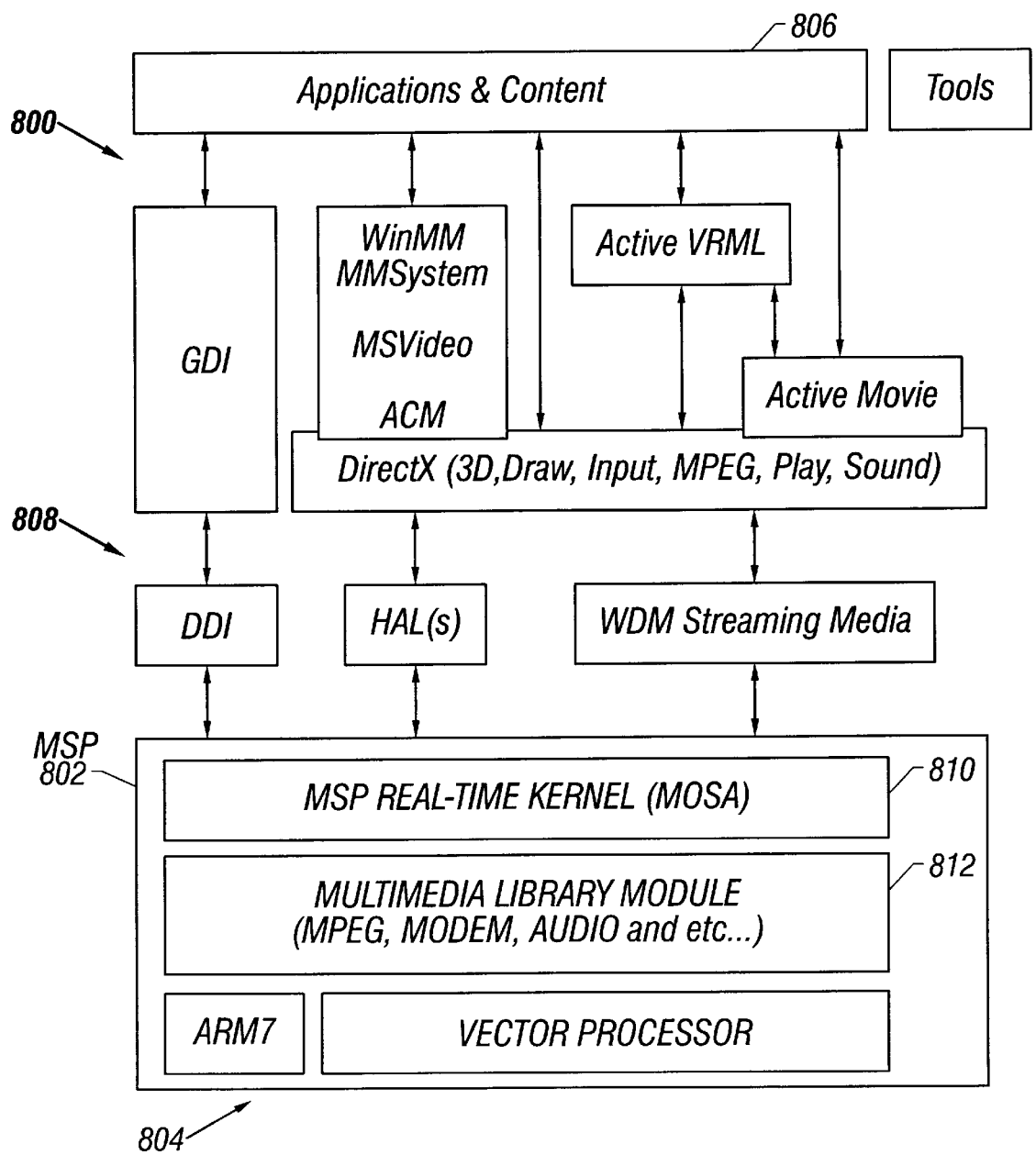
FIG. 8 is a schematic block diagram illustrating a firmware architecture of the multimedia signal processor.

Referring to FIG. 8, a schematic block diagram illustrates the software and firmware architecture 800 of the multimedia signal processor 104 including MSP system component software 802 executing on the multimedia signal processor 104 and PC applications and operating system software 808 executing on the host processor 102. The multimedia signal processor 104 is controlled by firmware including a vectorized-DSP firmware library 804 which executes on the vector processor 206 and a system management function block 806 which executes on the control processor 204. The a vectorized-DSP firmware library 804 and the system management function block 806 are included in MSP system component software 802. The architecture 800 advantageously separates signal processing functionality from host application control operations to simplify software development, improve software design management and reduce applications development and maintenance costs.

The MSP system component software 802 executes exclusively on the control processor 204 and includes an MSP real-time kernel 810, a multimedia library module 812, the system management function block 806 and the vectorized-DSP firmware library 804. The MSP real-time kernel 810 is typically responsible for interfacing to the host processor 102, resource management, I/O device handling and most interrupt and exception processing. The MSP real-time kernel 810 includes software for interfacing to Windows™ and Windows NT™ software executing in the host processor 102. The MSP real-time kernel 810 also includes software for selecting and downloading selected application firmware from the host processor 102, software for scheduling tasks for execution in the control processor 204 and the vector processor 206, and software for managing system resources of the multimedia signal processor 104 including memory and I/O devices. The MSP real-time kernel 810 includes software for synchronizing communication between tasks of the multimedia signal processor 104 and software for reporting MSP-related interrupt, exception and status conditions.

The a vectorized-DSP firmware library 804 performs substantially all digital signal processing functions. The a vectorized-DSP firmware library 804 also controls specific special interrupts such as a Coprocessor Interrupt which is issued by the control processor 204 to the vector processor 206, or a Hardware Stack Overflow Exception, which is generated within the vector processor 206.

The multimedia library module 812 performs communications-handling functions including data communication, MPEG video and audio, speech coding and synthesis, SoundBlaster™-compatible audio and the like. The MSP real-time kernel 810 is a real-time, robust, multitasking, pre-emptive operating system including enhancements which facilitate multimedia applications executing on the multimedia signal processor 104.

The PC applications and operating system software 808 executing in the host processor 102 controls the multimedia signal processor 104 by reading and writing MSP control and status registers via the system bus 106, and writing to shared data structures that are resident to the system memory 116 and resident to the multimedia signal processor 104.

MSP program execution begins with the control processor 204 which executes a first execution stream. The control processor 204 may initiate a second independent execution stream in the vector processor 206. Operations of the control processor 204 and the vector processor 206 are synchronized through specific coprocessor instructions that operate in the control processor 204, including STARTVP, INTVP and TESTVP instructions, and special instructions executing in the vector processor 206, including VJOIN and VINT instructions. Data transfer between the control processor 204 and the vector processor 206 are performed using data movement instructions executed in the control processor 204.

After power-up, the multimedia signal processor 104 automatically enters a self-test sequence to fully test functionality. The self-test sequence includes initialization of all registers in the multimedia signal processor 104 and execution of on-chip self-test diagnostics to verify functionality of components of the multimedia signal processor 104. At the end of the self-test sequence, the multimedia signal processor 104 executes MSP system component software 802 which loads and executes MSP initialization software and loads and executes the MSP real-time kernel 810. The multimedia signal processor 104 supports three types of reset operations including a hardware-controlled system reset through the PCI bus, a software-controlled system reset through the PCI System Reset bit in the MSP control register, and a software-controlled restart through the control processor 204 and a vector restart bit in the MPS control register.

Figure 9:
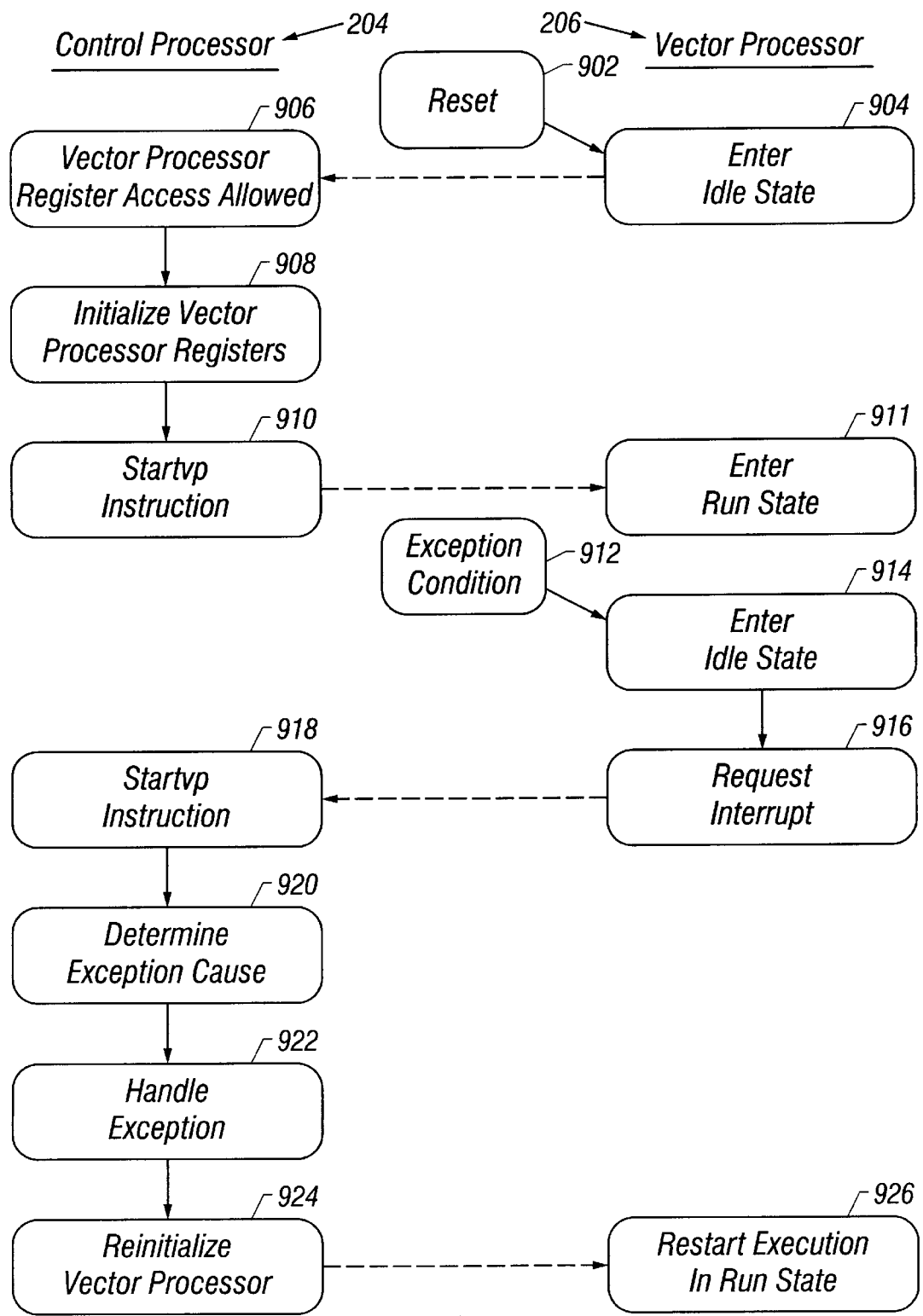
FIG. 9 is a flowchart which illustrates operations relating to interrupt and exception handling in the multimedia multiprocessor system.

Referring to FIG. 9, a flowchart illustrates operations relating to interrupt and exception handling in the multimedia multiprocessor system 100.

The vector processor 206 performs very limited control and management functions within the multimedia multiprocessor system 100. Specifically, although the vector processor 206 generates exceptions, the vector processor 206 does not include a capability to handle exceptions. Instead, exceptions and reset initialization are handled by the control processor 204. Furthermore, the control processor 204 is allowed to read or write the vector processor 206 only when the vector processor 206 is idle. Accordingly, the control processor 204 operates as a controlling processor and the vector processor 206 operates as a controlled processor under control of the controlling processor.

In this manner, the multimedia multiprocessor system 100 includes a plurality of processors which are asymmetric in the sense that the vector processor 206 and the control processor 204 have mutually dissimilar control and data-handling characteristics. The asymmetric processors are controlled by a single operating system. The vector processor 206 and the control processor 204 have instruction sets that are mutually independent. The multimedia multiprocessor system 100 uses a multiprocessor architectural definition of interrupt and exception handling in which the vector processor 206 has a large machine state or context and a large data width and many registers. In one illustrative embodiment, a vector processor 206 is has a 288-bit data width with 64 288-bit vector registers, over 80 32-bit scalar registers and 4 Kbytes of scratch pad memory. The large machine state of the vector processor 206 includes a relatively large number of registers with the registers having a relatively large number of bits. The vector processor 206 is highly efficient for processing large data structures such as arrays or vectors but not optimized for handling small data structures such as bits and flags. Thus the vector processor 206 includes circuits for detecting exceptions but defers interrupt and exception handling operations to the control processor 204. The control processor 204 has a small machine state and data width, for example 16 or 32-bits, which are advantageous for executing operating system programs such as interrupt and exception handling since control programs typically involve monitoring and control of individual flags and pointers.

The vector processor 206 detects an exception condition and, rather than servicing the condition, sends an interrupt signal to the control processor 204 and enters an idle state and remains in the idle state until the conditions or sources that caused the exception are serviced by operations of the control processor 204. Control of the multimedia multiprocessor system 100 is simplified since exception and interrupt control operations need not be coordinated, since all control operations are performed by the control processor 204 alone.

The vector processor 206 operates in a run state (VP_RUN) and an idle state (VP_IDLE), which are defined in accordance with the MSP architecture, to respectively indicate whether the vector processor 206 is executing or has indefinitely suspended execution. On reset 902 of the multimedia multiprocessor system 100 the vector processor 206 enters the VP_IDLE state 904. The control processor 204 is only permitted to read or write a register 906 in the vector processor 206 during the VP_IDLE state. Results of a read operation or a write operation which are executed by the control processor 204 and directed to a register of the vector processor 206 when the vector processor 206 is in the VP_RUN state are "boundedly undefined". A "boundedly undefined" result is a state of the multimedia multiprocessor system 100 that can be generated by any sequence of instructions in the multimedia signal processor 104. Accordingly, read and write accesses of registers within the vector processor 206 by the control processor 204 are only allowed when the vector processor 206 is in the VP_IDLE state.

The control processor 204 initializes registers 908 in the vector processor 206. After initializing registers in the vector processor 206 to a selected state, the control processor 204 executes a STARTVP instruction 910 to change the state of the vector processor 206 to the VP_RUN state 911.

When the vector processor 206 encounters an exception condition 912, the vector processor 206 enters the VP_IDLE state 914 and signals the control processor 204 with an interrupt request 916. The vector processor 206 remains in the VP_IDLE state until the control processor 204 executes another STARTVP instruction 918. The control processor 204 determines the nature of the reported exception 920 by reading registers in the vector processor 206 and handles the exception 922 in a defined manner. The control processor 204 then reinitializes 924 registers in the vector processor 206, if desired, and restarts execution 926 of the vector processor 206.

The vector processor 206 is more efficient at saving and restoring registers within the vector processor 206 than is the control processor 204. Accordingly, performance advantages are achieved when the control processor 204 programs the vector processor 206 to execute register save and restore instructions during context switching operations. An advantageous context switching operation is discussed in detail in copending U.S. patent application Ser. No. 08/697,102, entitled "EFFICIENT CONTEXT SAVING AND RESTORING IN MULTIPROCESSORS", S. P. Song et al., filed on the filing date of the present application.

The vector processor 206 enters the VP_IDLE state upon reset and when an exception is detected to facilitate system design and programming, and to simplify synchronization of the processors at system reset. Exceptions typically occur infrequently so that the interrupt handling of the vector processor 206 is greatly simplified without significantly reducing the functionality or the performance of the vector processor 206. Furthermore, responsiveness to exceptions is commonly considered to be a feature of limited significance. For example, many conventional applications programs which execute in real-time, such as multimedia application programs, include programming which disables responsiveness to a exception events in a real-time operating mode. In another example, some conventional applications programs use a saturation mode to avoid arithmetic or underflow conditions during real-time arithmetic processing.

While the invention has been described with reference to various embodiments, it will be understood that these embodiments are illustrative and that the scope of the invention is not limited to them. Many variations, modifications, additions and improvements of the embodiments described are possible. For example, the embodiments are described as systems which utilize a multiprocessor system including a Pentium host computer and a particular multimedia processor. Other processor configurations may be used in other embodiments.

What is claimed is:

1. A computer system comprising:
a plurality of mutually-coupled processors including processors having mutually dissimilar control and data-handling characteristics;
a common operating system for controlling the plurality of processors;
an interruption and exception handler for operating in conjunction with the operating system including:
an interrupt and exception detector operating on a first processor of the plurality of processors for detecting interrupt and exception conditions of the first processor; and
an interrupt and exception subhandler operating on a second processor of the plurality of processors for detecting interrupt and exception conditions of the first processor and for handling the interrupt and exception conditions of the first processor and the second processor in combination.

2. A computer system according to claim 1 wherein:
the second processor is a control processor having a defined data path width; and
the first processor is a vector processor having a wide data path width that is substantially larger than the data path width of the second processor.

3. A computer system according to claim 1 wherein:
the interrupt and exception detector operating on the first processor of the plurality of processors deactivates the first processor to an idle state in response to a detected exception.

4. A computer system according to claim 1 wherein:
the second processor has read and write access to control and status registers of the first processor.

5. A computer system according to claim 4 wherein:
the interrupt and exception detector operating on the first processor of the plurality of processors deactivates the first processor to an idle state in response to a detected exception; and
the second processor is constrained to have read and write access to control and status registers of the first processor when the first processor is in the idle state.

6. A computer system comprising:
a plurality of mutually-coupled processors including processors having mutually dissimilar control and data-handling characteristics;
a common operating system for controlling the plurality of processors;
an interruption and exception handler for operating in conjunction with the operating system including:
an interrupt and exception detector operating on a first processor of the plurality of processors for detecting interrupt and exception conditions of the first processor, the interrupt and exception detector disabling the first processor into an idle state in response to detection of an exception, the first processor being activated from the idle state by signals from another processor of the plurality of processors.

7. A computer system according to claim 6 wherein the interrupt and exception handler further comprises:
an interrupt and exception subhandler operating on a second processor of the plurality of processors and controlling an interrupt and exception response of the first processor.

8. A computer system according to claim 7 wherein:
the second processor is a control processor having a defined data path width; and
the first processor is a vector processor having a wide data path width that is substantially larger than the data path width of the second processor.

9. A computer system comprising:
a plurality of mutually-coupled processors including processors having mutually dissimilar control and data-handling characteristics;
a common operating system for controlling the plurality of processors;
an interruption and exception handler for operating in conjunction with the operating system on a first processor and a second processor of the plurality of processors, the second processor having read and write access to control and status registers of the first processor.

10. A computer system according to claim 9 wherein the interruption and exception handler further comprises:
an interrupt and exception detector operating on the first for detecting interrupt and exception conditions of the first processor.

11. A computer system according to claim 9 wherein the interruption and exception handler further comprises:
an interrupt and exception subhandler operating on the second processor for detecting interrupt and exception conditions of the first processor and for handling the interrupt and exception conditions of the first processor and the second processor in combination.

12. A computer system according to claim 9 wherein:
the second processor is a control processor having a defined data path width; and the first processor is a vector processor having a wide data path width that is substantially larger than the data path width of the second processor.

13. A computer system according to claim 9 wherein:

the interrupt and exception detector operating on the first processor of the plurality of processors deactivates the first processor to an idle state in response to a detected exception; and the second processor is constrained to have read and write access to control and status registers of the first processor when the first processor is in the idle state.

14. A method of handling interrupts and exceptions in a computer system including asymmetric processors comprising:

operating a first processor of the asymmetric processors as a controlled processor;

operating a second processor of the asymmetric processors as a controlling processor;

detecting an exception condition in the controlled processor;

sending an interrupt request signal from the controlled processor to the controlling processor indicating the exception condition of the controlled processor;

invoking an idle state in the controlled processor in response to the exception condition; and operating the controlling processor to handle the exception condition of the controlled processor.

15. A method according to claim 14 further comprising:

detecting a reset of the computer system; and invoking an idle state of the controlled processor in response to the computer system reset.

16. A method according to claim 15 wherein the step of operating the controlling processor to handle the exception condition of the controlled processor further comprises:

operating the controlling processor to initialize registers of the controlled processor when the controlled processor is in the idle state in response to the interrupt request signal from the controlled processor; and operating the controlling processor to execute an instruction for activating the controlled processor into a run state when the registers of the controlled processor are initialized.

17. A method according to claim 16 wherein the step of operating the controlling processor to handle the exception condition of the controlled processor further comprises:

operating the controlling processor to read register information from the controlled processor;

determining a type of exception based on the register information; and operating the controlling processor to handle the exception based on the exception type.

18. A method according to claim 14 further comprising:

operating the controlling processor to read and write registers of the controlled processor when the controlled processor is in the idle state.

19. A method according to claim 14 further comprising:

operating the controlling processor and the controlled processor using a single operating system; and executing mutually independent instruction sets in the controlling processor and the controlled processor.

20. A method according to claim 14 wherein:

the controlled processor is a vector processor or data processor having a large machine state and a large data width; and the controlling processor is a control processor having a machine state and data width that are substantially smaller than the machine state and data width of the controlled processor.

21. A multimedia computer system comprising:

a control processor;

a vector or data processor coupled to the control processor, the vector or data processor having a large machine state and a large data width in comparison to the control processor;

a coprocessor interface coupled between the control processor and the vector or data processor;

an exception detector coupled to the vector or data processor for detecting an exception condition and, in response to the exception condition detection, sending an interrupt request to the control processor and disabling the vector or data processor to an idle state; and an exception handler coupled to the control processor for receiving the interrupt request and, in response to the interrupt request, handling the exception condition of the vector or data processor.

22. A multimedia computer system according to claim 21 wherein the coprocessor interface comprises:

a plurality of registers that are readable and writeable by the control processor and the vector or data processor;

a decoder for decoding instructions of the control processor instruction set and detecting extension instructions that are executable on the coprocessor interface; and a state machine for executing the extension instructions.

23. A multimedia computer system according to claim 21 wherein:

the control processor and the vector or data processor have mutually dissimilar control and data-handling characteristics.

24. A multimedia computer system according to claim 23 wherein:

the control processor has a defined data path width; and the vector or data processor has a wide data path width that is substantially larger than the data path width of the control processor.

25. A multimedia computer system according to claim 21 further comprising:

a host processor coupled to the control processor, the host processor including program codes for controlling operations of the control processor.

* * * * *